United States Patent
Morley et al.

(10) Patent No.: US 6,332,019 B1
(45) Date of Patent: Dec. 18, 2001

(54) TELECOMMUNICATIONS NETWORK WITH STORE FOR DATA ASSOCIATED WITH AN AREA CODE

(75) Inventors: Michael C Morley; Ian C. C Sturgess; David S Gardner, all of Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,501

(22) PCT Filed: Mar. 18, 1997

(86) PCT No.: PCT/GB97/00751

§ 371 Date: Mar. 24, 1998

§ 102(e) Date: Mar. 24, 1998

(87) PCT Pub. No.: WO97/36432

PCT Pub. Date: Oct. 2, 1997

Related U.S. Application Data

(63) Continuation-in-part of application No. 08/680,922, filed on Jul. 16, 1996.

(30) Foreign Application Priority Data

Mar. 27, 1996 (EP) .................................................. 96302112

(51) Int. Cl.$^7$ .................................................. H04M 1/64

(52) U.S. Cl. .................................. 379/88.23; 379/201.01; 379/112

(58) Field of Search .................................. 379/88.26, 211, 379/112, 201, 88.06, 88.23

(56) References Cited

U.S. PATENT DOCUMENTS

| 4,747,124 | * | 5/1988 | Ladd . |
| 5,148,474 | | 9/1992 | Haralambopoulos . |
| 5,333,180 | | 7/1994 | Brown et al. . |
| 5,930,343 | * | 7/1999 | Vasquez ........................... 379/130 X |

FOREIGN PATENT DOCUMENTS

| 327 472 | 8/1989 | (EP) . |
| 491 497 | 6/1992 | (EP) . |
| 96 03000 | 2/1996 | (WO) . |

* cited by examiner

*Primary Examiner*—Creighton Smith
(74) *Attorney, Agent, or Firm*—Nixon & Vanderhye P.C.

(57) ABSTRACT

A telecommunications network stores data including geographical locations, network types and the like associated with calling codes. If, for example, a customer wants to identify to where a dialed call relates, a service access code may be dialed and a series of voice prompts encourages entry of digits identifying areas. Voice announcement peripherals are used to provide decoding of data to area name and, if further detail is available, to provide a more specific geographic location (e.g., a town name).

10 Claims, 6 Drawing Sheets

| Code | Area Location | Detail? | Chargeband |
|---|---|---|---|
| 00 | International | Yes | N/A |
| 01 | National | Yes | N/A |
| 0171 | London Area | Yes | NNNN |
| 01285 | Cirencester Area | Yes | NNNN |

⋮

| | | | |
|---|---|---|---|
| 0171492 | Holborn, London | No | NNNN |

⋮

| | | | |
|---|---|---|---|
| 01285 740 | Bibury, Gloucestershire | No | NNNN |

Per Code e.g. 0171 123 or 01285 74

| Number | Postcode | Address | Charge Area |
|---|---|---|---|
| 1111 | AB1/12AB | 00000000 | NNNN |
| 1112 | BD3/4ZZ | 12/345678 | NNNN |
| 1113 | AB1/5QQ | 00000000 | NNNN |
| 1114 | αβn/nnαβ | 22/345678 | NNNN |

⋮

| | | | |
|---|---|---|---|
| 9999 | αβn/nnαβ | 00000000 | NNNN |
| 9990 | αβn/nnαβ | 12/123456 | NNNN |

Fig 6

TELECOMMUNICATIONS NETWORK WITH STORE FOR DATA ASSOCIATED WITH AN AREA CODE

This application is a 371 of PCT/GB97/00751 filed Mar. 18, 1997 and is a continuation-in-part of our earlier co-pending commonly assigned U.S. application Ser. No. 08/680,922, filed Jul. 16, 1996.

BACKGROUND OF THE INVENTION

The present invention relates to telecommunications networks and more particularly to services provided by such networks.

The public switched telephone network (PSTN) is capable of providing customers with many services other than basic telephony. Digital networks such as that provided by BT in the United Kingdom have the ability to effect call connection very quickly. Thus dual tone multi frequency (DTMF) signalling from customers before, during or on termination of telephone calls can be used to connect special services. Further, special service platforms may be called by customers requesting connection to specified network numbers to provide additional services.

One service provided by the PSTN in the United Kingdom allows customers to identify a calling party's telephone number either using a display unit which is signalled when a call is offered or by calling a code to be advised of the latest call made. The customer may wish to know more about the source of the received call prior to making a return call as a result of the caller display service or as a result of a mailbox or answering machine message requests a return call.

Similarly, prior to making a call to a known telephone number the customer may wish to consider the likely cost involved or special factors associated with the telephone number such as the type of destination.

SUMMARY OF THE INVENTION

According to the present invention there is provided a telecommunications network including means to store data identifying a feature associated with at least a code portion of a telephone number, means responsive to signals transmitted from a customer line which signals identify the code portion, means to decode the data into a respective description of the feature associated with the transmitted code and means to transmit to the customer line an audible description of the decoded feature.

Preferably, the description associated with the code portion identifies a geographic location. Alternatively or additionally a charging rate identifier may be provided such that customers may be informed of the cost of making a call to the specified code. Further identifiers may include network type identity such that calls to a mobile network which may be insecure for certain purposes may be avoided.

Where the decoded feature is a changing rate identifier or denotes a call to a special service such as to an insecure network, control means may require confirmation signals to be transmitted from the customer line before completion of a call through the network.

In a further development of the invention, the data stored may be associated with a complete telephone number. Thus using a known telephone number a calling customer may obtain a post code or ZIP code for the address associated therewith.

BRIEF DESCRIPTION OF THE DRAWINGS

A telecommunications network in accordance with the invention will now be described by way of example only with reference to the accompanying drawings of which:

FIG. 6 is a schematic representation of data storage used by a service control point or intelligent peripheral of FIG. 1 to provide the services of FIGS. 3 to 5.

DETAILED DESCRIPTION

Figure 1:
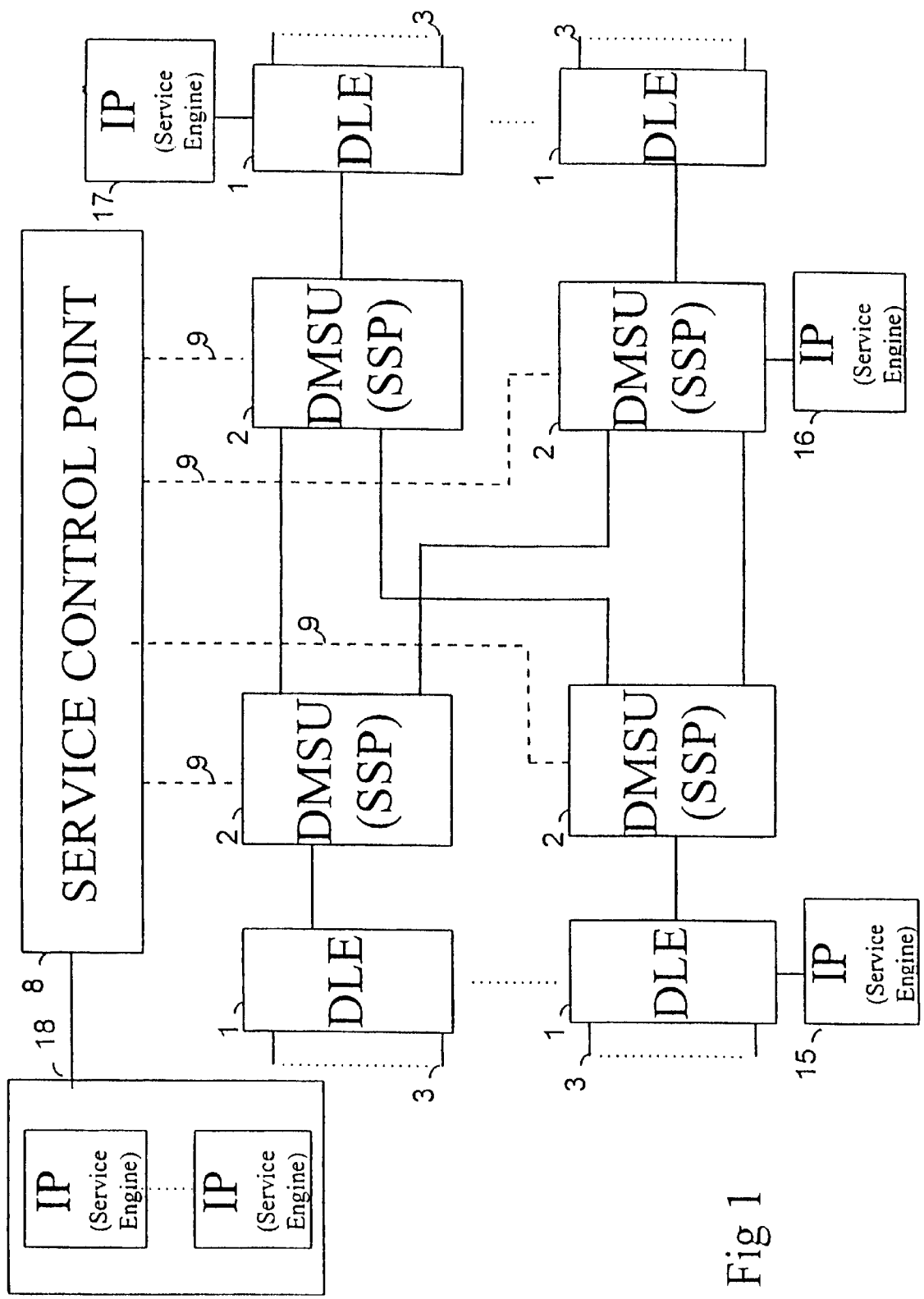
FIG. 1 is a block schematic diagram of the telecommunications network.

Referring now to FIG. 1 digital telecommunications networks, that is to say those which operate using time division multiplex channels normally comprise a number of digital local exchanges 1 of each which is parented on at least one of a number of fully interconnected digital main switching units 2. Each local exchange 1 provides service to a number of customer lines 3 any one of which may be switched through the network to any other line on any of the exchanges and to lines connected to other systems (not shown). The main PSTN in the United Kingdom is of this form.

The exchange switches 1 and 2 each have a processor control system associated therewith to provide intelligent handling of switching. Thus the processor unit associated with one of the switches 1 will receive transmitted digits from a customer line 3 which digits will indicate either a call to another line 3 on the same exchange 1 or requirement for connection to another point in the network. Where connection to another point in the network is required signalling channels are used to pass information to one of the DMSUs and then to a destination exchange possibly through a further DMSU 2. Positive interconnection between a line 3 on a first exchange 1 to line 3 on the destination exchange only occurs if the destination line 3 is available.

The rapid switching capability of a digital network means that a connection does not need to be completed until all the digits defining a destination have been received. Traditionally digital networks use service platforms (not shown) to provide special services to the network customers such as (e.g.) freephone 0800, local charging, premium rate services and the like. Specific service platforms will be located within the network at say one of the DMSUs 2 and, if a customer dials a network access code for one of the special services the call is connected to the appropriate service platform through the network, the service platform analyzing subsequent digits and connecting via a special switch back through the network to the required destination.

Figure 2:
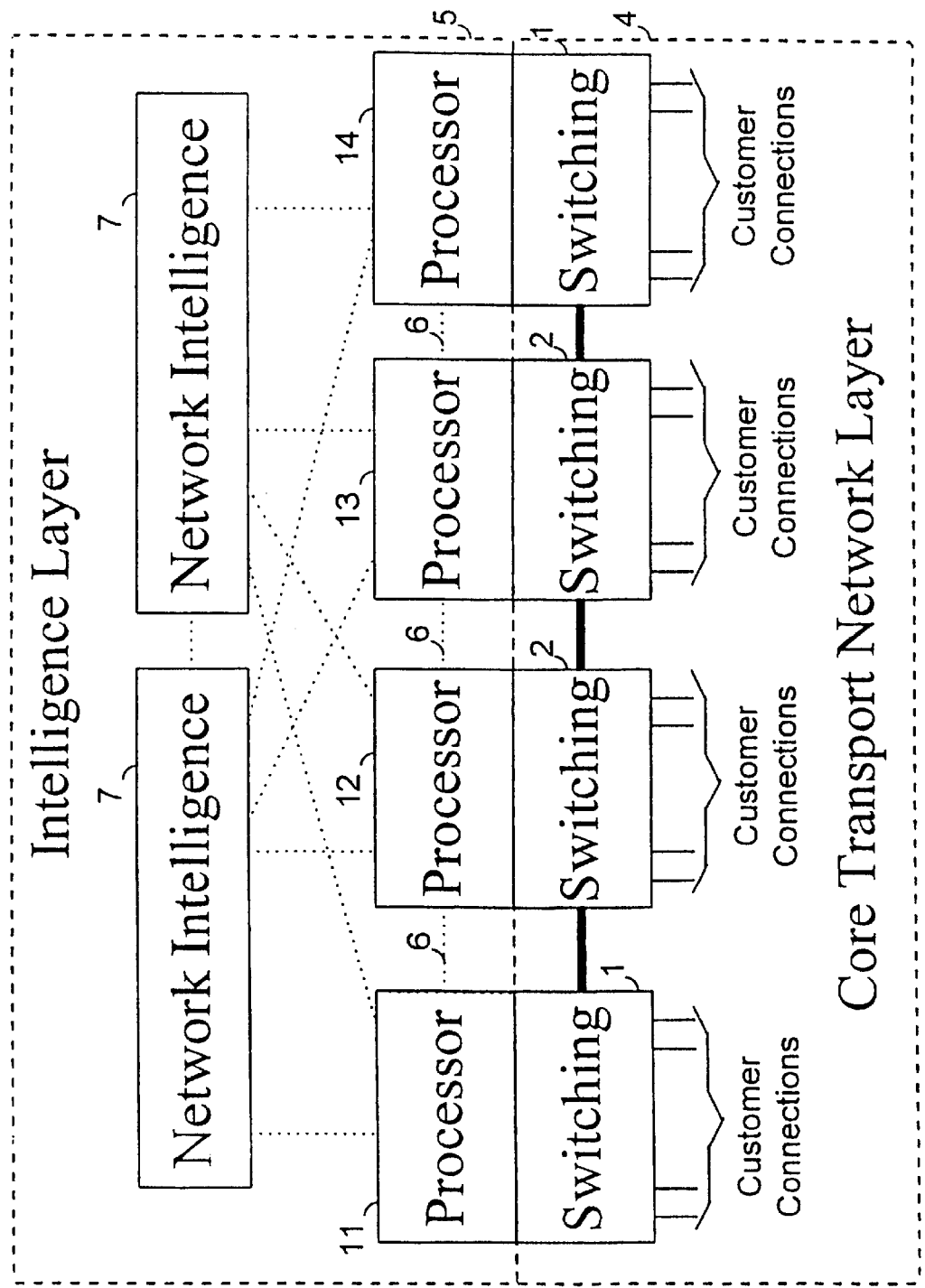
FIG. 2 is a schematic diagram showing an interpretation of the network elements of FIG. 1.

Providing such special platforms and additional switching capability can delay the introduction of new services. However, referring additionally to FIG. 2, it is possible to consider a telephone network as comprising a number of layers. A first layer, the core transport network layer 4, comprises the switching capability and trunking of the exchange network 1 and 2 with the trunking in-between while the processors 11, 12, 13 and 14 of the exchanges 1 and 2 represent an intelligence layer 5. A virtual path exists shown by dotted lines 6 between the computer facilities of the network. As C7 signalling is used to transfer information it is possible to add another level of intelligence here represented as network intelligence 7 having communication access with the processors of the switching units. Now, if a processor reaches a point at which it requires additional processing power it may refer to the higher intelligence layer 7 for instructions. Thus all that the processors of a switching unit 1, 2 need to do is to recognise a requirement for additional service functionality. The processors may be programmed to recognise customer action or customer signalling representing a trigger to additional service functionality. Once triggered the processor refers relevant data such as the identity of the calling line, the digits dialled, special class of service to the network intelligence layer 7 which may instruct the processor to perform specific tasks within its capacity for handling a particular call.

Thus referring back to FIG. 1 the intelligent network comprises service switching points which may be the digital local exchanges 1 or digital main switching units 2 and a service control point 8 (of which there may be several) to which the exchange processors refer via virtual signalling paths (shown dotted) 9. Specialised service engines or intelligent peripherals 15, 16 and 17 associated with specific service switching points may provide dedicated functions and calling lines 3 may be switched to these peripherals through the network as a result of instructions from the service control point 8. Thus, for example an intelligent peripheral may be equipped to provide voice prompts, message storage functionality or specific data storage or programming function. Alternatively or additionally intelligent peripherals 18 may stand alone from dedicated SSPs but still be accessible through the network either on a switched path or by direct connection (not shown).

The present invention is described with reference to an intelligent network although it will be appreciated that the kind of service here noted could be provided using dedicated service platforms.

The services to be described herein provide callers who know a code or a telephone number with additional information in relation to that code or telephone number. A first such service enables a customer to determine the location of a telephone call which a code has been provided and/or charges associated with making a call from his current location to that code. Further, the code may be deciphered to indicate to the customer special service access.

Figure 3:
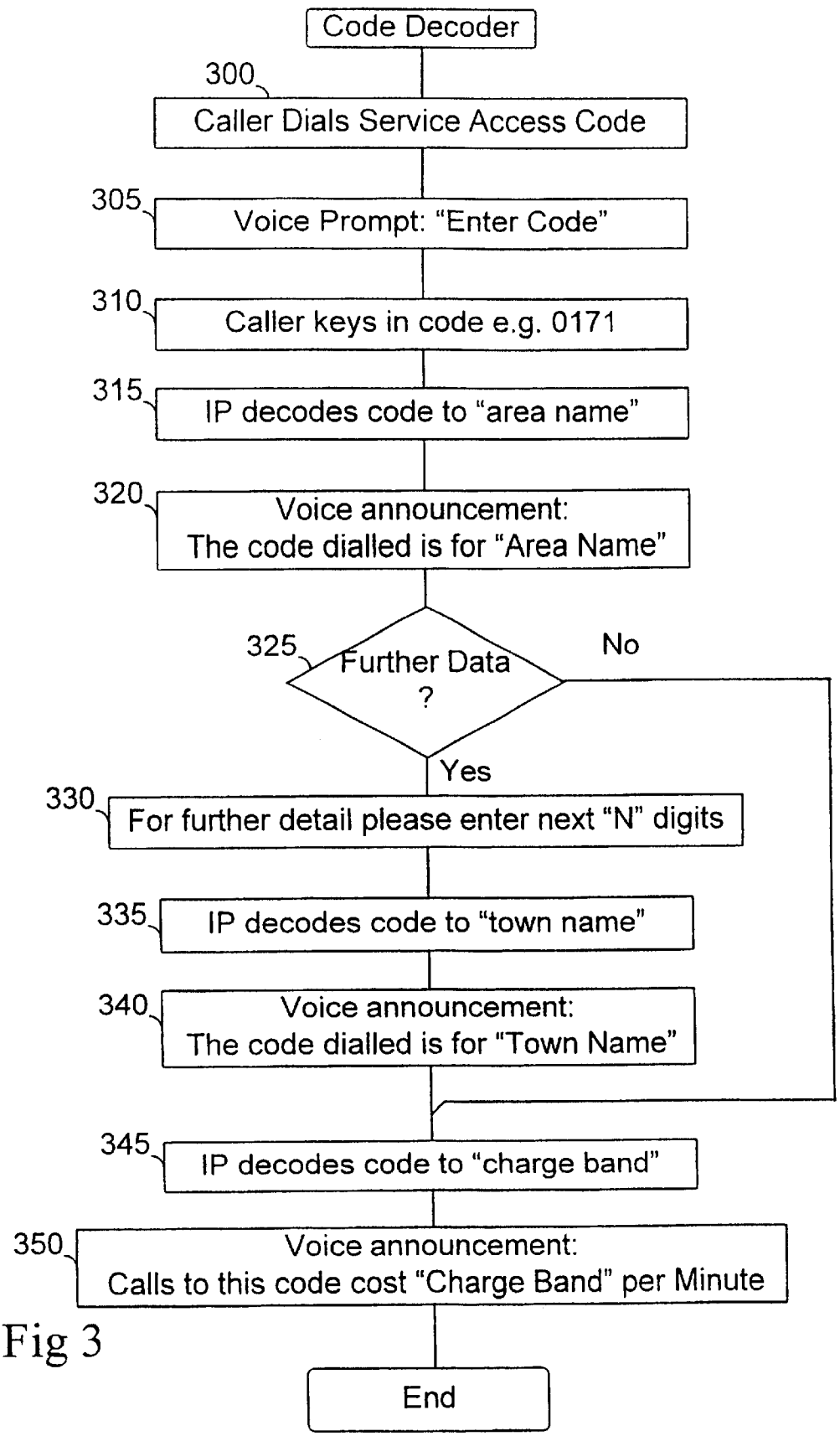
FIG. 3 is a service flow diagram in respect of an automated code decoder service.

Referring to FIG. 3, and to FIG. 1, when a caller dials the service access code, at step 300, the processor of local exchange 1 will be triggered and will signal to the service control point 8 the service request and calling line identity of originating calling line 3. The service control point 8 will instruct the SSP 2, for example, to connect the calling line 3 to one of the intelligent peripherals which can provide voice prompts and at the same time will instruct the SSP to collect digits dialled by the caller.

At step 305, the intelligent peripheral provides a voice prompt to the caller inviting entry of the code for which information is required.

Assuming that the caller enters a code, for example, in the UK the code for central London (0171), then referring to FIG. 6, additionally, when the digits are transferred to the service control point the data access indicates that the call is to the London area. The data is therefore transferred to an appropriate intelligent peripheral and the SSP is again instructed to connect the caller to the IP. The caller will now receive a voice announcement as indicated at step 315, indicating that the code dialled is for the London area.

Only a limited number of codes are shown in the data store although it will be appreciated that the directory services database of the PSTN operator will hold substantially more information that is shown here.

Considering now step 325, the SCP 8 is programmed to consider whether a flag is set in the database indicating that the geographical location can be narrowed down from additional digits. If the detail flag in the data store is specifically set then the customer is invited at step 330 to key a further number of digits which may be defined by the detail field. Thus, for London area codes, at step 330, the voice announcement peripheral will invite the customer to key a further three digits.

Assuming that the customer enters these digits then, for example, 492 will be decoded as indicating the Holborn London area in a voice announcement at step 340.

Additionally, the charge area shown against the code under charge band in the data store 6 is decoded at step 345 and used in conjunction with the customer calling line identity and the current time of day to provide a voice announcement to the customer indicating the cost per minute of calls to the dialled area.

It will be appreciated that where there are several charging periods, for example evening charges, weekend charges or peak charges depending upon the time of day or day of week then the system may provide information concerning all of the potential time periods. Alternatively, the customer may be invited to indicate in which period he wished to know the charge.

Although, for simplicity only a limited number of steps are shown in FIG. 3, it will be appreciated that if the customer line 3 from which the call originated clears at any point then the SCP 8 will instruct the SSP 2 to clear the call or the SSP 2 may simply clear the call through the network to the intelligent peripheral.

It will also be realised that if the customer is invited to enter further information if, within a predetermined period, no such entry is made, then the system will skip to the last section. Alternatively, the customer may be invited to enter, for example #, to skip to the charge band for the dialled area code.

A second example of area location in the data storage is given in which the code 01285 enables the charge band to be determined and give an approximate geographical location whereas a further three digits 740 are required to identify Bibury, Gloucestershire.

Figure 4:
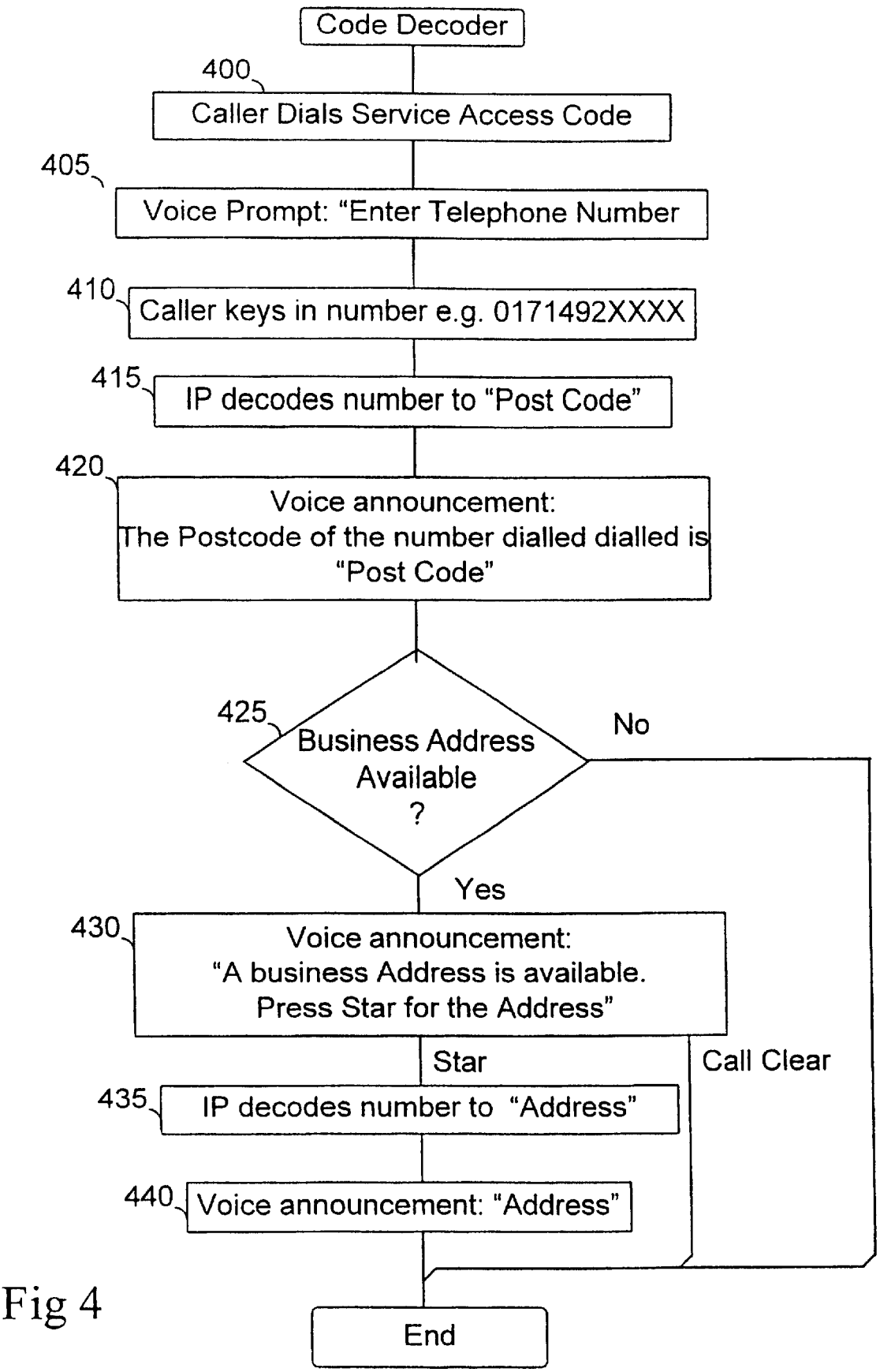
FIG. 4 is a service flow diagram in respect of an automated number decoder service.

In a more detailed development of the service, referring now also to FIG. 4, a customer may dial a service access code for obtaining a post code or ZIP code.

Again, when the appropriate access code is dialled at step 400, the SSP 2 will refer to the SCP 8 which will instruct the SSP to connect the calling line 3 through the network to a voice announcement IP 15 and to collect and forward the digits dialled by the caller.

At step 405, the peripheral 15 gives a voice announcement advising the calling line customer to enter a telephone number. Assuming that the caller does so as indicated at step 410, the received digits are translated using the per code data store the postcode of column two relevant to the signalled number is passed to an intelligent peripheral at step 415 to enable a voice announcement to the customer of the actual postcode. This service may be used where a customer knows, for example, an address and telephone number but does not have the actual postcode or ZIP code.

In order to protect the customer the system does not normally provide details of a narrower nature than the postcode. However, at customer option, the address may be made available to the calling customer. If this is the case that a business address is available this will be identified at step 425 of FIG. 4 by interrogation of the address column which identifies an intelligent peripheral number and a data location of an appropriate voice announcement within the peripheral. At step 430 the customer may be invited to key * for example to obtain the additional address information and at steps 425 and 430 the SSP connects the calling customer through the network to an to an intelligent peripheral in response to instructions from the SCP 8.

Again, if at any time the customer clears the call or does not enter a complete telephone number or a time-out occurs the SCP or intelligent peripheral may instruct the call to be cleared down. Additionally, as for FIG. 3, on completion of announcement or postcode and/or address information the system may provide charge band information.

Figure 5:
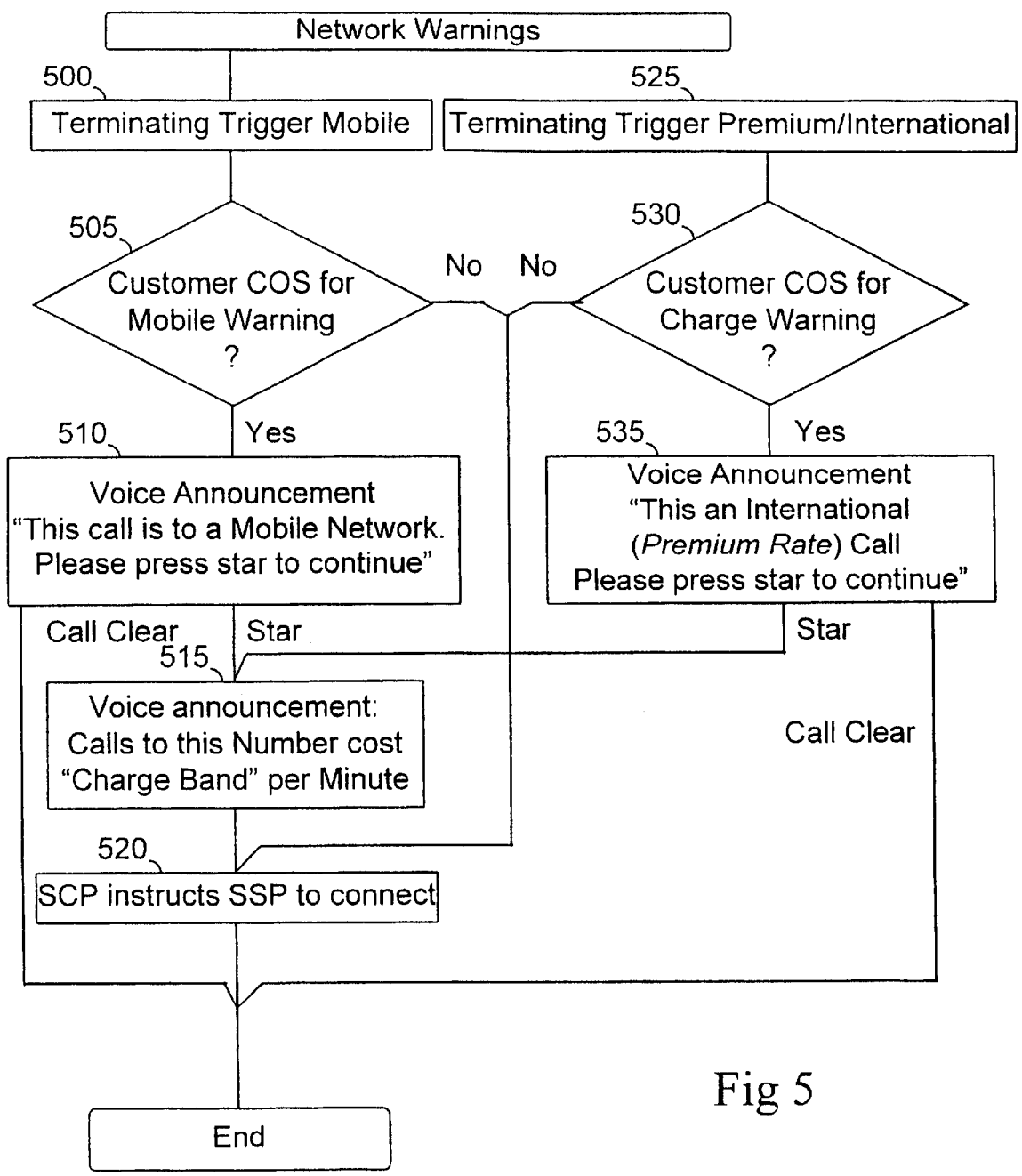
FIG. 5 is a service flow diagram of a network or call charge warning service.

Referring now to FIGS. 1 and 5, either for all customers or at a customer's request as indicated by customer's class of service calls to specific services may result in a warning to the customer. For example, some customers may not wish to make calls that may be insecure as a result of a destination radio link being involved. In this case, when signalling is transferred across the network from an originating service switching point 1 to a destination service switching point 1 the destination SSP may be triggered (or the originating SSP may be triggered on the code) and will transfer data to the SCP 8 which includes the class of service of the originating customer, the code dialled and CLI of the originating caller for example. This is shown as a terminating trigger mobile at step 500 of FIG. 5 which leads to the class of service being interrogated at step 505 and, if the customer is not subscribing to the service or has not given an indication that requires warning then the SCP 8 instructs the SSP 2 to effect connection of the call across the network.

If however the customer does require warning then at step 510 the calling line 3 is connected through the network to a voice announcement peripheral, say 17, and is advised that the call is on a mobile network. The customer may now be invited to confirm, for example, by pressing the star button on the telephone, if he wishes the call to be connected. Assuming that the call is to be connected then at step 515 the customer may be advised of the potential cost of the connected call based on the customer's CLI and the destination of the call. As previously indicated for customers who have not subscribed to the service the SCP 8 now instructs the SSP to connect the call through the network once confirmation has been received.

A similar service may be operated for customers who wish to avoid inadvertently calling premium rate services, for example those in which customer is charged a high rate to listen to messages at a distant point. In a similar manner, at step 525, a code trigger from the originating service switching point or a destination trigger at the terminating SSP will result in CLI, class of service and dialled telephone number being forwarded by the signalling channel to the SCP 8 for instruction. Again, if the customer is identified at step 530 as not subscribing or as not requiring the appropriate service at step 520 the SCP instructs the SSP to connect the call through the network.

Otherwise the customer is again connected through the network by the SSP acting under instruction of the SCP 8 to an appropriate intelligent peripheral, say 16, which has a voice announcement facility to provide a statement that this is a premium rate number and requiring the customer to confirm that the call should be connected.

A similar trigger operates for codes which indicate international calls which may result in a higher than normal charging rate to the customer.

What is claimed is:

1. A telecommunications network, comprising:
   a switching unit supplied with digits of a telephone number entered by a calling customer;
   a peripheral device coupled to the switching unit and including a data store storing geographic locations associated with telephone numbers or portions thereof, the peripheral device using the digits entered by the caller to access a geographic location in the data store corresponding to the entered digits and generating an audible description of the geographic location that is then supplied back to the calling customer.

2. The telecommunications network according to claim 1, wherein the data store further stores postal or zip codes associated with the telephone numbers or portions thereof, wherein the peripheral device uses the digits entered by the caller to access a postal or zip code in the data store corresponding to the entered digits and generates an audible description of the postal or zip code that is then supplied back to the calling customer.

3. The telecommunications network according to claim 1, wherein the data store stores calling charges associated with the telephone numbers or portions thereof, wherein the peripheral device uses the digits entered by the caller to access a calling charge in the data store corresponding to the entered digits and generates an audible description of the calling charge that is then supplied back to the calling customer.

4. The telecommunications network according to claim 1, wherein the data store stores address information associated with the telephone numbers or portions thereof, wherein the peripheral device uses the digits entered by the caller to access an address in the data store corresponding to the entered digits and generates an audible description of the address that is then supplied back to the calling customer.

5. A method of providing callers with information about called telephone numbers or portions thereof, comprising:

using digits of a telephone number entered by a calling customer to access a data store storing geographic locations associated with telephone numbers or portions thereof;

generating an audible description of the accessed geographic location; and supplying the audible description back to the calling customer.

6. The method according to claim 5, wherein the data store further stores postal codes associated with the telephone numbers or portions thereof usable for generating audible descriptions supplied back to the calling customer.

7. The method according to claim 5, wherein the data store further stores calling charges associated with the telephone numbers or portions thereof usable for generating audible descriptions supplied back to the calling customer.

8. The method according to claim 5, wherein the data store further stores address information associated with the telephone numbers or portions thereof usable for generating audible descriptions supplied back to the calling customer.

9. A telecommunications network, comprising:

a switching unit supplied with digits of a telephone number entered by a calling customer;

a peripheral device coupled to the switching unit and including a data store storing postal or zip codes associated with telephone numbers or portions thereof, the peripheral device using the digits entered by the caller to access a postal or zip code in the data store corresponding to the entered digits and generating an audible description of the postal or zip code that is then supplied back to the calling customer.

10. A telecommunications network, comprising:

a switching unit supplied with digits of a telephone number entered by a calling customer;

a peripheral device coupled to the switching unit and including a data store storing addresses associated with telephone numbers or portions thereof, the peripheral device using the digits entered by the caller to access an address in the data store corresponding to the entered digits and generating an audible description of the address that is then supplied back to the calling customer.

* * * * *